Oct. 31, 1961 V. T. ATKINSON 3,006,717
REGENERATION OF COPPER AMMONIUM SALT SOLUTION
Filed Feb. 26, 1959
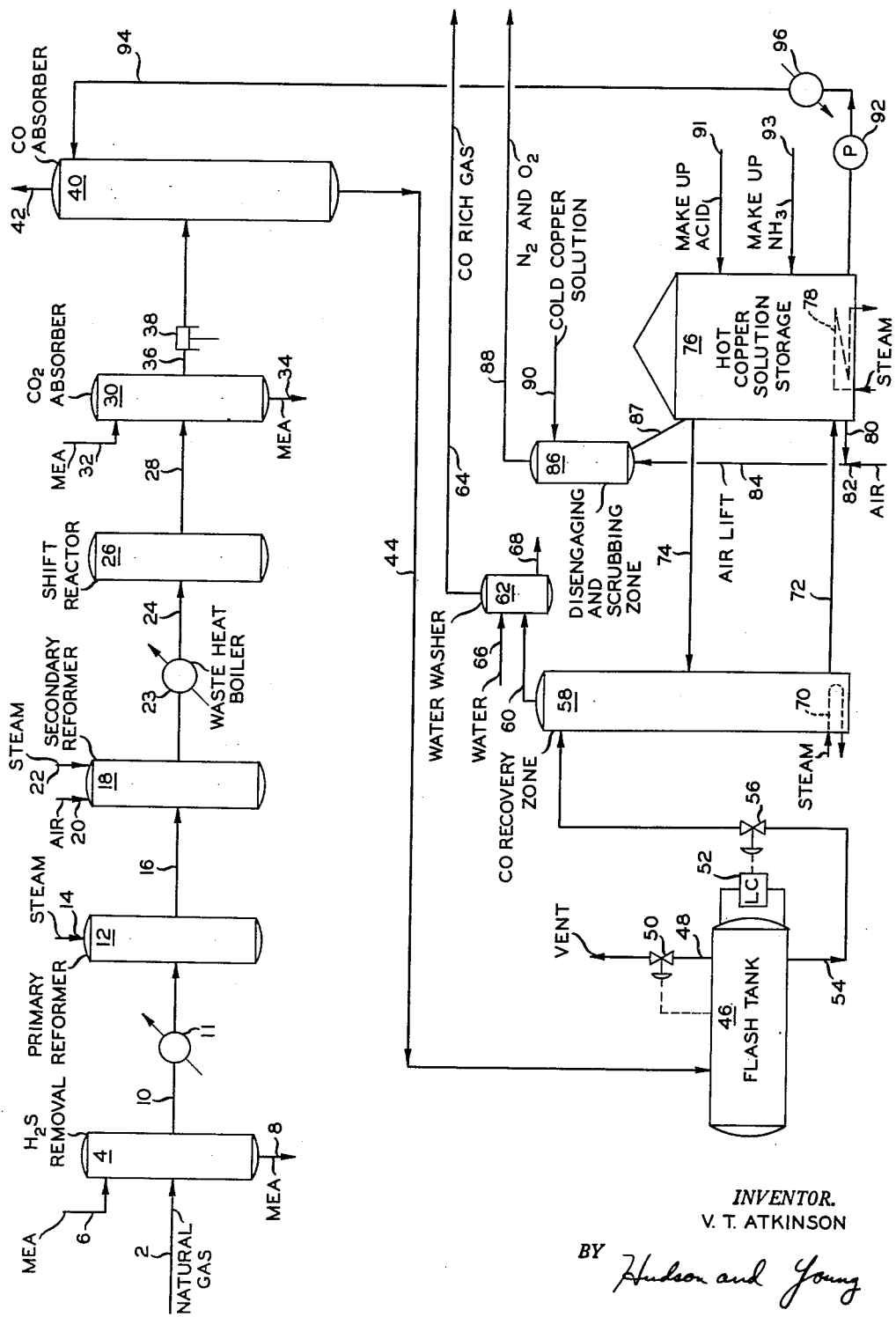
INVENTOR.
V. T. ATKINSON
BY Hudson and Young
ATTORNEYS United States Patent Office 3,006,717
Patented Oct. 31, 1961

3,006,717
REGENERATION OF COPPER AMMONIUM
SALT SOLUTION
Vernon T. Atkinson, Pasadena, Tex., assignor to Phillips Petroleum Company, a corporation of Delaware
Filed Feb. 26, 1959, Ser. No. 795,829
11 Claims. (Cl. 23—2)

This invention relates to the purification of ammonia synthesis gas. In one aspect it relates to the removal of carbon oxides from ammonia synthesis gas by treating said gas with copper ammonium salt solution, and regeneration and fortification of said salt solution. In another aspect the invention relates to improved method and apparatus for contacting copper ammonium salt solution, utilized in the removal of carbon oxides from ammonia synthesis gas, with regeneration air.

Purification of ammonia synthesis gas to effect the removal of carbon oxides can be provided by contacting said gas with a copper ammonium salt solution. Following this operation the salt solution is customarily regenerated to remove absorbed carbon oxides, refortified with acid, ammonia, copper, etc., as required to maintain its strength, and reused for purification of additional synthesis gas. The cupric ion content of the copper salt solution, which is desirably maintained within a certain range and is lowered during the contacting process, is usually increased and controlled by introducing air to the copper ammonium salt solution in the regeneration system. In the conventional method of operation the nitrogen and any unreacted oxygen or other components from the air are contained in the carbon oxides, namely, carbon monoxide and carbon dioxide, recovered from the regenerated salt solution. These undesirable materials reduce the carbon monoxide content of the gases, and when carbon monoxide is to be provided in a high purity, necessitate further treatment of these gases.

It is an object of this invention to provide improved process and apparatus for the purification of ammonia synthesis gas.

Another object of the invention is to provide improved process and apparatus for the regeneration and fortification of ammoniacal copper salt solution used in the absorption of carbon oxides from ammonia synthesis gas.

Still another object of the invention is to provide improved method and apparatus for contacting copper ammonium salt solution, used in the absorption of carbon oxides from ammonia synthesis gas, with air.

Yet another object of the invention is to provide improved process and apparatus for reducing impurities in carbon monoxide recovered during the regeneration of copper ammonium salt solution utilized in the absorption of carbon oxides from ammonia synthesis gas.

These and other objects of the invention will become more readily apparent from the following detailed description and discussion.

The foregoing objects are achieved broadly by heating a copper ammonium salt solution containing absorbed carbon oxides to release said oxides, thereafter contacting a portion of said solution with air, passing the mixture of air and solution to a disengaging zone, therein releasing unreacted components of the air from said solution and reusing the solution for the absorption of additional carbon oxides.

In one aspect of the invention the disengaging zone is elevated above the level from which the solution entering said zone is withdrawn, reaction air is employed to lift said solution to the disengaging zone and said solution is removed from the disengaging zone by gravity flow.

In another aspect of the invention the disengaging zone is refluxed with cold copper ammonium salt solution to remove ammonia from the unreacted components of the air.

The invention is applicable broadly to the treatment of copper ammonium salt solutions. These solutions find use generally in the absorption of gases and in particular in the absorption of the carbon oxides, carbon monoxide and carbon dioxide. The following discussion is directed to an application of the invention wherein copper ammonium salt solution is utilized to remove carbon oxides from an ammonia synthesis gas. This is not intended, however, in any limiting sense and is within the scope of the invention to treat copper ammonium salt solutions containing carbon oxides which have been used in any absorption process.

Ammonia synthesis gas is usually prepared by reacting a gaseous hydrocarbon, such as methane, with steam at elevated temperatures. The reaction can be carried out noncatalytically or preferably in the presence of a catalyst, such as, an oxide of nickel or cobalt. In addition to the nickel or cobalt oxide, other compounds can be added to the catalyst to promote the formation of the synthesis gas. The reaction, when catalyzed, is carried out in a temperature range usually of between about 600 and 1000° C. Somewhat higher temperatures are required for the noncatalytic reaction, namely between about 1000 and about 1300° C. The process can be carried out at pressures from as low as a few atmospheres to as high as several hundred atmospheres. The synthesis gas can be formed in a single stage operation or, if desired, two stages can be employed, with partial conversion of methane to carbon monoxide in the first stage and additional conversion of methane and further oxidation of a portion of the carbon monoxide to carbon dioxide in the second stage. While natural gas or methane is the preferred feedstock, other materials can also be employed in preparing the synthesis gas. Thus, in one method heavy hydrocarbon fractions are converted in the presence of oxygen or oxygen enriched air at more elevated temperatures to provide a noncatalytic conversion of the hydrocarbons to a mixture of hydrogen and carbon oxide. Following this operation nitrogen is added to the conversion gases to provide the desired ratio of hydrogen to nitrogen.

The raw synthesis gas contains a substantial quantity of carbon monoxide, and in order to provide additional hydrogen the gas is customarily contacted with a catalyst, such as iron oxide, which promotes the water gas shift reaction. In this reaction added steam reacts with carbon monoxide to form carbon dioxide and hydrogen. The shift reaction is usually carried out in a temperature range of between about 415 and about 440° C. and at substantially the same pressure as the synthesis gas formation. Leaving the water gas shift, the synthesis gas is passed through an absorption step in contact with an absorbent such as caustic or monoethanolamine, wherein the major proportion of carbon dioxide is removed. After this operation the synthesis gas is contacted with a copper ammonium salt solution for removal of the remaining carbon dioxide and carbon monoxide. The salt solutions which can be employed for this purpose include copper salts in general, for example copper ammonium acetate, formate, nitrate, chloride, sulfate, bromide, iodide, etc. Preferred salt solutions are copper ammonium acetate and copper ammonium formate.

The copper solution which is employed in purifying the ammonium synthesis gas is preferably reused, thus it becomes necessary to remove absorbed carbon oxides from this solution. This is effected by introducing the solution containing carbon oxides to a heated vessel wherein release of the oxides takes place. The copper solution is then available for reuse in purification of the synthesis gas. During the course of the treatment of the synthesis gas and recovery of carbon oxides from the copper solution portions of the copper solution and the various components contained therein are lost from the system. In order to maintain the strength of the copper solution it becomes necessary to either periodically or continuously introduce additional ammonia, copper and make-up acid to the system. In addition the copper solution during use is reduced in cupric ion content and it is necessary to contact the solution with air in order to oxidize the copper and return the cupric ion content of the solution to the desired level, usually from 2–3 percent.

In the process of providing a reuseable absorbent, the copper ammonium salt solution is first heated in a separation zone to release the carbon oxides. Usually it is preferred to carry out this operation in such a manner that the released gases are contacted with copper ammonium salt solution entering said zone whereby any ammonia present in these gases is reabsorbed in the salt solution. During the process of absorption and desorption of the carbon oxides the ammonia salt solution becomes at least partially spent, through loss of copper, ammonia, etc., from the system. To provide a salt solution which can be reused the spent solution is regenerated by the addition of ammonia, copper, and acid, as necessary to return its strength to the desired level. Usually the regeneration treatment is provided by introducing spent solution to an accumulation, storage or regeneration zone whereby the various components required for makeup can be readily introduced to the solution. In the past, air required to maintain the cupric copper content of the ammonium salt solution has also been introduced to said solution in the accumulation or storage zone, with unreacted components of the air, vaporized ammonia, etc., being vented from said zone to the carbon oxide separation zone. As a result carbon oxides released from the separation have contained substantial amounts of undesirable nitrogen and oxygen.

In carrying out the method of this invention in one embodiment thereof, a portion of the copper ammonium salt solution which can be for example, copper ammonium formate, is withdrawn from the storage zone, contacted and lifted upwardly with air into an elevated disengaging and scrubbing zone. During this process air reacts to oxidize copper in the salt solution thereby converting cuprous copper to cupric copper. The reaction is carried out at about the temperature of the heated copper solution in the storage zone which is substantially the same temperature as that maintained in the carbon oxide separation zone, namely, between about 160 and about 175° F. The amount of solution withdrawn and treated with air can vary over a wide range since the oxidation process can be carried out either continuously or as a batch operation. However, usually only a small portion of the copper solution is treated; for example, when oxidation is carried out continuously the amount of solution withdrawn from the storage zone is usually not more than about 15 percent by volume of the solution entering said zone. The quantity of air employed in the oxidation and regeneration of the copper ammonium salt solution can also vary; however, it is usually not desirable to employ more than the minimum amount of air required to maintain the desired cupric copper concentration since any additional air merely increases the problem of separating unconverted gases from the copper salt solution in the disengaging and scrubbing zone. The gases released from the disengaging and scrubbing zone comprise the unreacted components of the air, namely, nitrogen, oxygen and minor quantities of various inert gases. To prevent loss of ammonia from the copper salt solution cold solution is introduced in contact with the released gases in the disengaging and scrubbing zone.

By operating in accordance with the foregoing procedure it is possible to maintain a copper ammonium salt solution of desired strength and composition in the storage zone, from which said solution can be withdrawn as required for reuse in the absorption of carbon oxides from ammonia synthesis gas. The carbon oxide content of the gas released from the copper ammonium salt solution in the separation zone is substantially increased as compared to gases obtained by utilizing the prior method of operation. Since only a minor portion of the copper ammonium salt solution need be regenerated with air at any one time, a small addition of apparatus is adequate to effect the substantial improvement in purity of the carbon oxide gases which is obtained.

In order to more clearly describe the invention and provide a better understanding thereof reference is had to the accompanying drawing which is a diagrammatic illustration of an ammonia synthesis gas unit and associated equipment for the separation from synthesis gas of carbon oxides and regeneration of copper ammonium salt solution.

Referring to the drawing, natural gas containing principally methane, with small quantities of ethane, propane and butane is introduced through conduit 2 to hydrogen sulfide removal vessel 4. In this vessel the gas is contacted with monoethanolamine introduced through conduit 6, and amine containing hydrogen sulfide is removed through conduit 8. The purified gas feed is then passed through conduit 10 and heater 11 to primary reformer 12 wherein the gas is contacted with nickel oxide catalyst in the presence of steam, introduced to the reformer vessel through conduit 14. The primary reformer is maintained at a temperature of about 700° C. and a pressure of about 35 p.s.i.g. whereby the major proportion of hydrocarbon is converted to carbon monoxide and carbon dioxide. The effluent from the primary reformer is introduced to a secondary reformer 18 through conduit 16 wherein additional reforming is carried out in the presence of air and steam introduced to the reformer through conduits 20 and 22 respectively. The secondary reformer is maintained at a slightly higher temperature, that is about 840° C. In this vessel additional hydrocarbon is converted and a portion of the carbon monoxide present in the entering gas is converted to carbon dioxide. Sufficient air is introduced to the secondary reformer to provide an exit gas having a hydrogen to nitrogen mol ratio of about 3:1. The gases leaving the secondary reformer are cooled by passage through waste heat boiler 23 and are then introduced to shift reactor 26 through conduit 24. Additional steam (not shown) is added to the gas either before or after the waste heat boiler so that the resulting steam-gas mixture contains sufficient steam for the shift reaction. In the shift reactor the gases contact an iron oxide catalyst whereby the major proportion of the carbon monoxide present therein is converted with steam to carbon dioxide and hydrogen. This reaction is carried out at a temperature of about 430° C. and at about the same pressure as the secondary reforming step. Following the shift reaction the gases are passed through $CO_2$ absorber 30 wherein they are contacted with monoethanolamine for the removal of carbon dioxide. The amine is introduced to tower 30 through conduit 32 and is removed along with absorbed carbon dioxide through conduit 34. The gases leaving tower 30 are passed through conduit 36, compressor system 38 wherein they are increased in pressure to about 2000 pounds/sq. in. gauge and are then introduced to CO absorption tower 40. In this vessel the gases encountered their final scrubbing, in this instance with copper ammonium formate solution, whereby remaining carbon dioxide and carbon monoxide are removed. The scrubbed gases, now comprising essentially hydrogen and nitrogen, in the mol ratio of about 3:1 are removed overhead from tower 40 through conduit 42 and transferred to the ammonia synthesis plant (not shown). Copper solution containing absorbed carbon monoxide and carbon dioxide is passed to conduit 44 to flash tank 46 wherein the pressure is reduced to allow release from the copper solution of inert gases such as methane, nitrogen, hydrogen, oxygen, etc. These gases are released through conduit 48 and control valve 50 which is actuated by the pressure in the flash tank. A liquid level controller 52 is provided on the flash tank to maintain the desired level therein. Liquid from the flash tank is withdrawn through conduit 54, passed through control valve 56 which is actuated by liquid level controller 52 and is introduced to carbon monoxide recovery zone 58. In this zone which is maintained at a top temperature of about 70° F. and a pressure of about 1 to 2 p.s.i.g., carbon dioxide and carbon monoxide are released from the copper solution by the application of increased temperature. Heat required for this purpose is provided by steam introduced to reboiler 70 which is disposed in the bottom of the recovery zone. The vapors released in the recovery zone, joined by those introduced from the hot copper solution storage zone through conduit 74, are scrubbed with entering copper solution and pass overhead from the recovery zone through conduit 60 and enter water washer 62. In this vessel the gases are washed with water introduced through conduit 66 to remove residual ammonia, the latter material and water being discharged through conduit 68. The remaining gases comprising carbon monoxide, carbon dioxide and minor amounts of nitrogen, hydrogen and oxygen are removed from the water washer thorugh conduit 64.

Copper solution, now substantially freed from carbon oxides, is removed from the bottom of recovery zone 58 and introduced through conduit 72 to hot copper solution storage zone 76, which is maintained at a temperature of about 160° F. and a pressure of about 3 p.s.i.g. In this zone, which provides storage for the recycle solution, provision is made to restore the copper solution in strength and composition by adding thereto makeup acid and ammonia, as required, through conduits 91 and 93, respectively. Also as desired, fresh copper (not shown) can be added to the copper solution in the storage zone. It is sometimes advantageous to maintain the copper solution at an elevated temperature over a substantial period of time and thus effect more complete removal of absorbed carbon oxides. For this purpose a steam heater 78 is provided in storage zone 76 through which additional heat can be introduced to the copper solution. Any gases released from the copper solution are vented from the storage zone to recovery zone 58 through conduit 74. For the purpose of restoring the cupric copper content of the salt solution a portion of the solution is withdrawn from the storage zone through conduit 80, entrained in air introduced through conduit 82 and passed upwardly through conduit 84 into disengaging and scrubbing zone 86. In this zone unreacted components of the air separate from the copper solution and pass overhead through conduit 88. While in zone 86 the gases are scrubbed with cold copper solution introduced through conduit 90 to remove therefrom any ammonia released during the oxidation process. The combined regenerated solution and cold scrubbing solution are returned by gravity flow through conduit 87 to the storage zone. As required regenerated copper solution is withdrawn from the storage zone through pump 92, cooled in cooler 96 and returned to absorber 40 through conduit 94.

The preceding discussion has been directed to a preferred embodiment of the invention; however, this is not intended in any limiting sense and it is within the scope of the invention to employ other apparatus and process arrangements which are suitable for carrying out the invention.

The following example is presented in illustration of the invention.

EXAMPLE

Copper ammonium salt solution is regenerated by two different methods: method A (in accordance with the prior art) in which air is introduced to the hot copper solution storage zone 76 and vapors from said zone are vented to the carbon monoxide recovery zone 58 and method B in which regeneration is carried out in accordance with the method of this invention, both processes being carried out in a system like that of the accompanying drawing. Analyses of the gases recovered from the carbon oxide separation zone 58 are set forth in the table below. Additional columns are presented illustrating the gas composition obtained by the two methods after removal of carbon dioxide.

*Table*

|  | Method A | | Method B | |
| --- | --- | --- | --- | --- |
|  | Before $CO_2$ Removal | After $CO_2$ Removal | Before $CO_2$ Removal | After $CO_2$ Removal |
| Air used, c.f.m. | 60 | 60 | 60 | 60 |
| $N_2$, Vol. percent | 8.0 | 9.1 | 0.2 | 0.2 |
| $CO_2$, Vol. percent | 13.0 | 0.2 | 12.0 | 0.2 |
| CO, Vol. percent | 78.9 | 90.6 | 87.7 | 99.5 |
| $H_2$, Vol. percent | 0.1 | 0.1 | 0.1 | 0.1 |

It is noted in the above table that the method of the invention provides a carbon monoxide gas (line 64) substantially free of nitrogen whereas the conventional method of air treatment provides a gas containing large quantities of this undesirable component.

Having thus described the invention by providing a specific example thereof it is to be understood that no undue limitations or restrictions are to be drawn by reason thereof and that many variations and modifications are within the scope of the invention.

I claim:

1. In a process in which a copper ammonium salt solution containing absorbed carbon oxides is increased in temperature in a first zone to release said oxides, said solution, reduced in cupric copper content, is contacted with air to increase the cupric copper content thereof and said solution is thereafter used again to absorb carbon oxides, the improvement which comprises contacting said solution with air prior to its reuse, passing the mixture of air and solution to a disengaging zone, therein releasing unreacted components of the air, removing said components from the system thereby decreasing the contamination of said oxides released in said first zone and thereafter reusing the solution from the disengaging zone for the absorption of carbon oxides.

2. The process of claim 1 in which the disengaging zone is elevated above the level from which the solution entering said zone is withdrawn, reaction air is employed to lift said solution to the disengaging zone and said solution is removed from the disengaging zone by gravity flow.

3. In a process in which an ammonia synthesis gas containing carbon oxides is contacted in a first zone with a copper ammonium salt solution to absorb said carbon oxides, said carbon oxides are released from solution by increased temperature in a second zone, said solution, reduced in cupric copper content, is contacted with air to increase the cupric copper content thereof and said solution is thereafter recycled to said first zone, the improvement which comprises contacting a portion of said solution with air to form a mixture thereof, passing said mixture of air and solution to a disengaging zone, therein releasing unreacted components of the air, removing said components from the system thereby decreasing the contamination of said oxides released in said first zone and thereafter combining solution from the disengaging zone with recycle solution.

4. The process of claim 3 in which the disengaging zone is elevated above the level from which the solution entering said zone is withdrawn, reaction air is employed to lift said solution to the disengaging zone and said solution is combined with the recycle solution by gravity flow.

5. In a process for removal of carbon oxides from ammonia synthesis gas in which said gas containing carbon oxides is contacted in an absorption zone with a copper ammonium salt solution whereby carbon oxides are dissolved in said solution, the solution containing carbon oxides is passed to a recovery zone wherein carbon oxides are released from solution by heating, said solution, reduced in cupric copper content, is passed to a storage zone and said solution is recycled from the storage zone to the absorption zone, the improvement which comprises removing a portion of said solution from the storage zone, passing said solution upwardly in contact with air to a scrubbing zone whereby oxygen reacts with said solution to increase the cupric copper content thereof, countercurrently contacting said solution in the scrubbing zone with cold copper ammonium salt solution to remove ammonia vapors, venting unreacted components of the air from the scrubbing zone and returning the combined solution to the storage zone.

6. The process of claim 5 in which reaction air is used to lift said solution from the storage zone to the scrubbing zone and combined solution is returned to the storage zone by gravity flow.

7. The process of claim 6 in which the copper ammonium salt is cuprous ammonium formate.

8. The process of claim 6 in which the copper ammonium salt is cuprous ammonium acetate.

9. Apparatus comprising in combination storage means adapted to contain a level of copper ammonium salt solution, conduit means for introducing heated salt solution to said storage means, conduit means for withdrawing salt solution from said storage means, second conduit means for withdrawing salt solution from said storage means openly communicating with a vertically extended conduit means disposed externally of said storage means, means for introducing air to the bottom of said vertically extended conduit means, disengaging means openly communicating with the top of said vertically extended conduit means, disposed at a greater elevation than said storage means, conduit means for introducing cold salt solution to said disengaging means, conduit means for removing gases from said disengaging means and conduit means for returning combined solution from said disengaging means to said storage means.

10. Apparatus comprising in combination a separation means adapted to contain a level of copper ammonium salt solution superposed by a vapor phase, means for introducing heat to copper ammonium salt solution in said separation means, conduit means for introducing salt solution containing absorbed carbon oxides to said separation means, conduit means for withdrawing separated carbon oxides from said separation means, a storage means adapted to contain a level of copper ammonium salt solution superposed by a vapor phase, conduit means for introducing salt solution from said separation means to said storage means, conduit means interconnecting the vapor spaces of said separation means and storage means, conduit means for withdrawing salt solution from said storage means, second conduit means for withdrawing salt solution from said storage means openly communicating with a vertically extended conduit means disposed externally of said storage means, means for introducing air to the bottom of said vertically extended conduit means, disengaging means openly communicating with the top of said vertically extended conduit means disposed at a greater elevation than said storage means, conduit means for introducing cold salt solution to said disengaging means, conduit means for removing gases from said disengaging means and conduit means for returning combined solution from said disengaging means to said storage means.

11. Apparatus comprising in combination a vertically elongated separation vessel adapted to contain a level of copper ammonium salt solution superposed by a vapor phase, a heat exchanger for introducing heat to copper ammonium salt solution in said separation vessel, a conduit for introducing salt solution containing absorbed carbon oxides to said separation vessel, a conduit for withdrawing separated carbon oxides from said separation vessel, a storage tank adapted to contain a level of copper ammonium salt solution superposed by a vapor phase, a conduit for introducing salt solution from said separation vessel to said storage tank, a conduit interconnecting the vapor spaces of said separation vessel and storage tank, a conduit for withdrawing salt solution from said storage tank, a second conduit for withdrawing salt solution from said storage tank openly communicating with a vertically extended conduit disposed externally of said storage tank, a conduit for introducing air to the bottom of said vertically extended conduit, a disengaging vessel openly communicating with the top of said vertically extended conduit disposed at a greater elevation than said storage tank, a conduit for introducing cold salt solution to said disengaging vessel, a conduit for removing gases from said disengaging vessel and a conduit for returning combined solution from said disengaging vessel to said storage tank.

References Cited in the file of this patent

UNITED STATES PATENTS 1,597,345    Dely  ---------------- Aug. 24, 1926
2,043,263    Porter  -------------- June 9, 1936